(12) United States Patent
Tan

(10) Patent No.: US 6,700,764 B2
(45) Date of Patent: Mar. 2, 2004

(54) INTEGRATED POWER FACTOR CORRECTION AND MOSFET INTEGRATED CIRCUIT

(75) Inventor: Allen Tan, Hsinchu (TW)

(73) Assignee: Champion Microelectronics Corp., Hsinchu (TW)

(*) Notice: Subject to any disclaimer, the term of this patent is extended or adjusted under 35 U.S.C. 154(b) by 0 days.

(21) Appl. No.: 10/105,291

(22) Filed: Mar. 26, 2002

(65) Prior Publication Data

US 2003/0184938 A1 Oct. 2, 2003

(51) Int. Cl.$^7$ .................................. H02M 3/335
(52) U.S. Cl. .................. 361/91.1; 363/41; 323/222
(58) Field of Search ............ 363/41; 323/222; 361/91.1

(56) References Cited

U.S. PATENT DOCUMENTS

| | | | | |
|---|---|---|---|---|
| 5,349,284 A | * | 9/1994 | Whittle | 323/207 |
| 5,416,387 A | * | 5/1995 | Cuk et al. | 315/209 R |
| 5,515,261 A | * | 5/1996 | Bogdan | 363/89 |
| 5,519,306 A | * | 5/1996 | Itoh et al. | 323/222 |
| 5,576,941 A | * | 11/1996 | Nguyen et al. | 363/21.07 |
| 5,923,152 A | * | 7/1999 | Guerrera | 323/222 |

* cited by examiner

Primary Examiner—Bao Q. Vu
(74) Attorney, Agent, or Firm—Rosenberg, Klein & Lee

(57) ABSTRACT

The present invention provides power quality correction circuitry integrated into a single IC, therefore saving space and reducing costs while increase potential and frequency. An embodiment of the present invention discloses an integrated circuit with integrated power factor correction circuit (PFC) and MOSFET circuit. Another embodiment of the present invention provides a power factor correction circuit, a pulse width modulation (PWM) control circuit, and MOSFET circuits integrated into a single IC. Therefore, signals provided by the present invention ensure a smooth and high quality power to the system, thus improving the quality and performance of the overall system.

13 Claims, 4 Drawing Sheets

INTEGRATED POWER FACTOR CORRECTION AND MOSFET INTEGRATED CIRCUIT

BACKGROUND OF THE INVENTION

1. Field of the Invention

Figure 1:
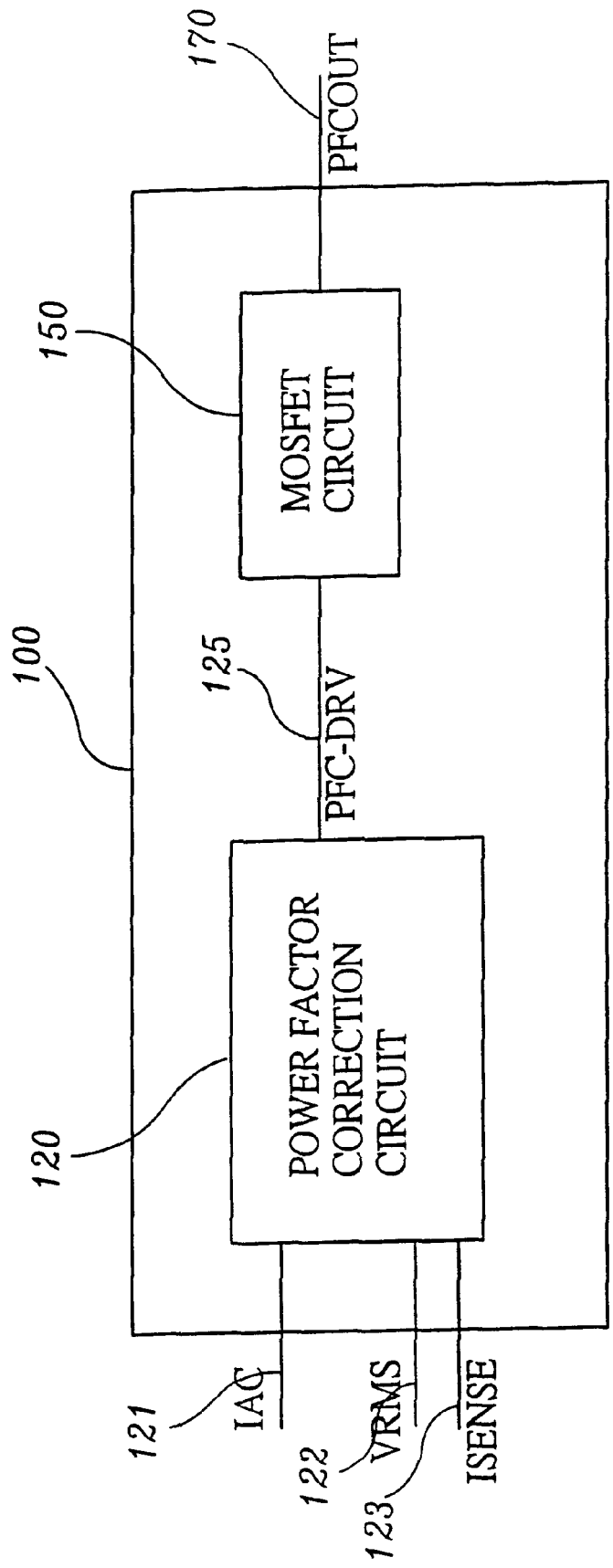

The present invention relates to a switching power supply. More specifically, the present invention discloses an integrated circuit with an integrated power factor correction (PFC) circuit and MOSFET (Metal Oxide Semiconductor Field Effect Transistor) switch.

2. Description of the Prior Art

Power supplied to a system is one of the most determining factors in achieving a successful and high performing system. If the power is not of high quality, the overall system performance is affected and degraded.

There are many problems associated with power supply design that a designer must consider when developing a system.

Factors that must be considered are stability, controllability, reliability, and efficiency. After considering these factors, improving power quality must be addressed.

However, techniques to improve quality and performance often occupy excess space that is very valuable in compact systems.

Therefore, there is a need for a power factor correction circuit and MOSFET circuit integrated into a single IC therefore saving space and reducing costs while increase potential and frequency. Additionally, there is a need for a power factor correction circuit, a pulse width modulation control circuit, and MOSFET circuits integrated into a single IC, therefore saving additional space.

SUMMARY OF THE INVENTION

To achieve these and other advantages and in order to overcome the disadvantages of the conventional method in accordance with the purpose of the invention as embodied and broadly described herein, the present invention provides an integrated circuit with an integrated power factor correction (PFC) circuit and MOSFET switch and an integrated circuit with an integrated power factor correction (PFC) circuit, a pulse width modulation control (PWM) circuit, and MOSFET switch circuits.

An objective in modern power supply design is to provide the best quality of power to a system. However, there are many factors that can degrade the quality of this power and thus must be considered when developing a power supply system.

Generally, the power factor is defined as the ratio of total active power to total apparent power in volt-amperes in an ac circuit, where voltage and current are RMS values and include the effects of harmonics as well as the effects of phase displacement. If both voltage and current are sinusoidal, the power factor is the cosine of the angle between them.

However, in many applications, not only is the current waveform highly non-sinusoidal, but it is also out of phase with the voltage supply. Hence, these loads have a non-unity power factor, and draw reactive power.

To compensate these loads, a means to supply the reactive current at the appropriate times must be designed. A conventional approach utilizing a simple capacitor isn't capable of doing this. A capacitor only compensates basic sinusoidal power factor lags, like those from linear inductors.

A technique of active power factor correction is to make the input to a power supply look like a simple resistor. Active power factor correction is capable of doing this by programming the input current in response to the input voltage. As long as the ratio between the voltage and current is constant, the input will be resistive thus making the power factor equal to 1. If the ratio is not constant, the input will contain phase displacement or distortion. This will degrade the power factor thus degrading the performance or quality of the power and system.

Therefore, a power factor correction technique is used to increase the power factor so that the phase angle between the voltage and current approaches zero in a circuit.

As mention previously, the quality of the power is important. High quality DC current is smooth and constant with very low ripple or noise. However, current derived from AC sources often contains ripple. Ripple is significant because it can affect the performance of the total system.

Pulse width modulation is a power conversion technique which converts AC voltage to a lower voltage DC signal. Pulse width modulation basically controls the duty cycle as well as the frequency of the power.

An object of pulse width modulation (PWM) control circuits is to filter the output to provide a smooth power. The frequency of the pulse width modulation control circuit is controlled to maintain a continuous smooth output voltage.

The present invention provides a power factor correction circuit (PFC) and a MOSFET circuit integrated into a single IC, therefore saving space and reducing costs while increase potential and frequency. Therefore, signals provided by the present invention ensure a smooth and high quality power to the system, thus improving the quality and performance of the overall system.

In an embodiment of the present invention, the integrated circuit further comprises a reference voltage circuit which provides a VREF output.

Another embodiment of the present invention provides a power factor correction circuit, a pulse width modulation control circuit, and MOSFET circuits integrated into a single IC.

The power factor correction circuit comprises an IAC input, a VRMS input, an ISENSE input, a RAMP1 input, a VFB input, VEAO output, an IEAO output, and a PFC-DRV output.

The IAC input and VRMS input supply input signals to the power factor correction circuit.

The ISENSE input is utilized by the power factor correction circuit to detect and limit the current to the power factor correction circuit. If the current is not within the desired range, the PFC-DRV output will be held low or shut off, thus protecting the integrity of the power factor correction circuit and the MOSFET circuit.

The power factor correction circuit further comprises a low power detection circuit, a VCC over-voltage protection circuit, a PFC over-voltage protection circuit, and a PFC current limiting circuit. The outputs of these protection circuits are logically considered so that if any one of these circuits detects one of these undesirable conditions, the PFC-DRV output of the power factor correction circuit is held low or switched off.

The MOSFET circuit is connected to the PFC-DRV output of the power factor correction circuit. The output of the MOSFET circuit is provided as PFCOUT.

The pulse width modulation control circuit comprises a RAMP2 input, a VDC input, an SS input, a DCILIMIT input, and a PWM-DRV output.

The VDC input, VFB input, and VCC input supply input signals to the pulse width modulation control circuit.

The DCILIMIT input is utilized by the pulse width modulation control circuit to detect and limit the current to the pulse width modulation control circuit. If the current is not within the desired range, the PWM-DRV output will be held low or shut off, thus protecting the integrity of the pulse width modulation control circuit and the MOSFET circuit.

The pulse width modulation control circuit further comprises a duty cycle limit circuit, a VIN OK circuit, a DC current limit circuit, and an under-voltage circuit. The outputs of these circuits are logically considered and if an undesirable condition is encountered, the PWM-DRV output of the pulse width modulation control circuit is held low or switched off.

The MOSFET circuit is connected to the PWM-DRV output of the pulse width modulation control circuit. The output of the MOSFET circuit is provided as PWMOUT.

The present invention provides a power quality correction circuitry integrated into a single IC, therefore saving space and reducing costs while increase potential and frequency. Therefore, signals provided by the present invention ensure a smooth and high quality power to the system, thus improving the quality and performance of the overall system.

These and other objectives of the present invention will become obvious to those of ordinary skill in the art after reading the following detailed description of preferred embodiments. It is to be understood that both the foregoing general description and the following detailed description are exemplary, and are intended to provide further explanation of the invention as claimed.

BRIEF DESCRITPION OF THE DRAWINGS

Figure 2:
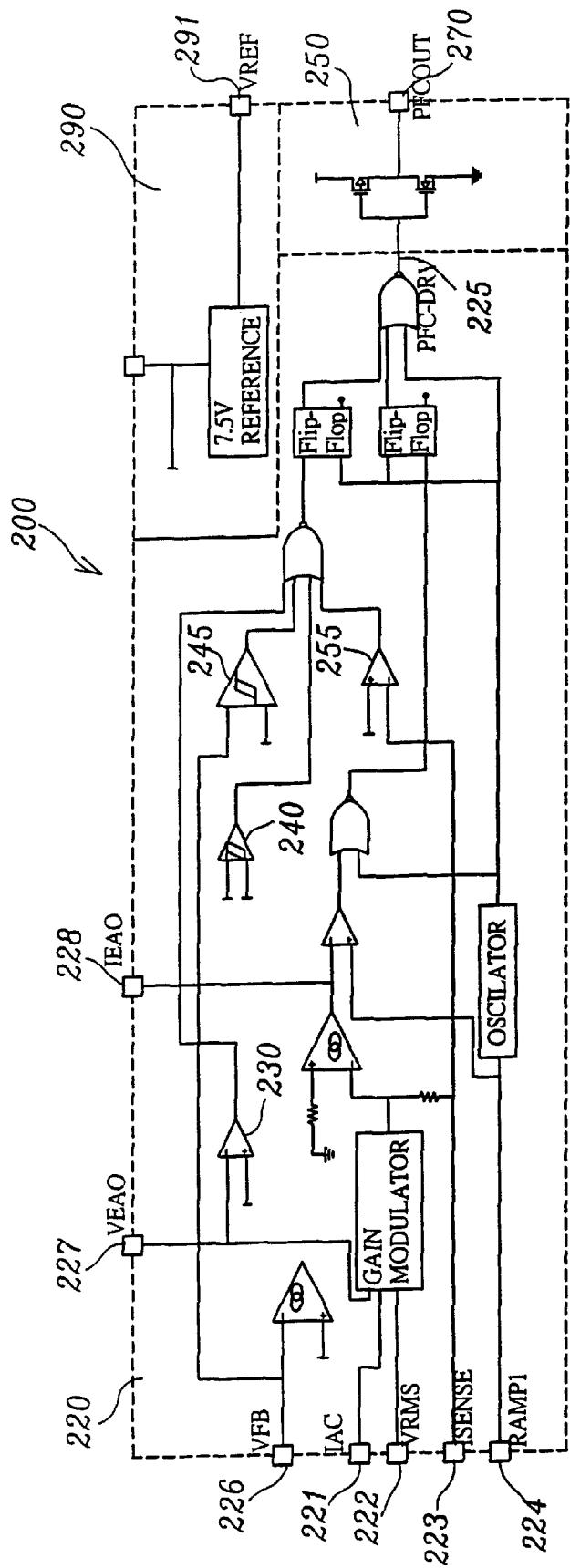
Figure 3:
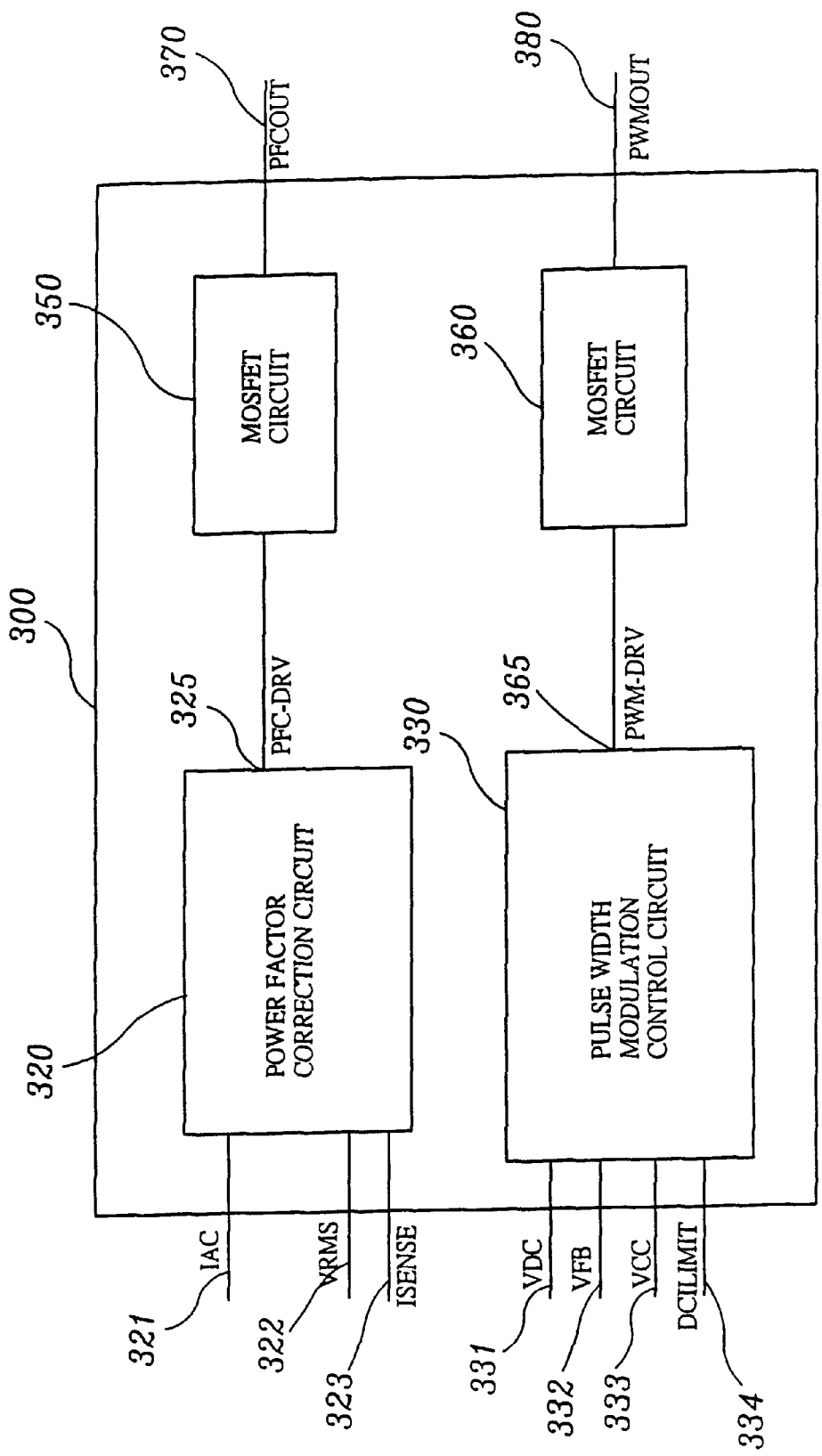
Figure 4:
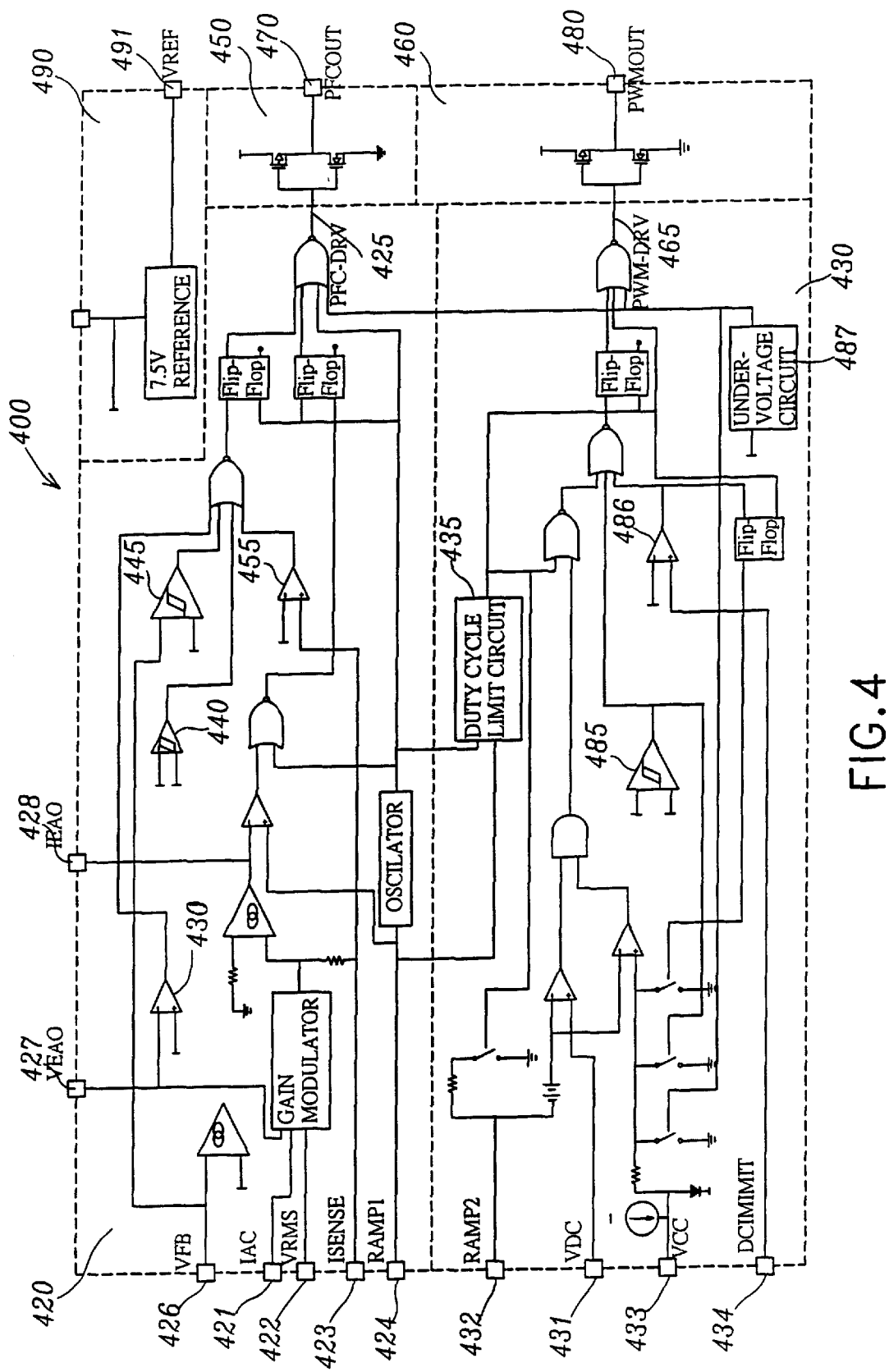

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 is a block diagram illustrating an integrated circuit with integrated power factor correction circuit and MOSFET circuit according to an embodiment of the present invention;

FIG. 2 is a circuit diagram illustrating an integrated circuit with integrated power factor correction circuit and MOSFET circuit according to an embodiment of the present invention;

FIG. 3 is a block diagram illustrating an integrated circuit with integrated power factor correction circuit, pulse width modulation control circuit, and MOSFET circuits according to an embodiment of the present invention; and FIG. 4 is a circuit diagram illustrating an integrated circuit with integrated power factor correction circuit, pulse width modulation control circuit, and MOSFET circuits according to an embodiment of the present invention.

DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

An objective in modem power supply design is to provide the best quality of power to a system. However, there are many factors that can degrade the quality of this power and thus must be considered when developing a power supply system.

Generally, the power factor is defined as the ratio of total active power to total apparent power in volt-amperes in an ac circuit, where voltage and current are RMS values and include the effects of harmonics as well as the effects of phase displacement. If both voltage and current are sinusoidal, the power factor is the cosine of the angle between them.

However, in many applications, not only is the current waveform highly non-sinusoidal, but it is also out of phase with the voltage supply. Hence, these loads have a non-unity power factor, and draw reactive power.

To compensate these loads, a means to supply the reactive current at the appropriate times must be designed. A conventional approach utilizing a simple capacitor isn't capable of doing this. A capacitor only compensates basic sinusoidal power factor lags, like those from linear inductors.

A technique of active power factor correction is to make the input to a power supply look like a simple resistor. Active power factor correction is capable of doing this by programming the input current in response to the input voltage. As long as the ratio between the voltage and current is constant, the input will be resistive thus making the power factor equal to 1. If the ratio is not constant, the input will contain phase displacement or distortion. This will degrade the power factor thus degrading the performance or quality of the power and system.

Therefore, a power factor correction technique is used to increase the power factor so that the phase angle between the voltage and current approaches zero in a circuit.

As mention previously, the quality of the power is important. High quality DC current is smooth and constant with very low ripple or noise. However, current derived from AC sources often contains ripple. Ripple is significant because it can affect the performance of the total system.

Pulse width modulation is a power conversion technique which converts AC voltage to a lower voltage DC signal. Pulse width modulation basically controls the duty cycle as well as the frequency of the power.

An object of pulse width modulation control circuits is to filter the output to provide a smooth power. The frequency of the pulse width modulation control circuit is controlled to maintain a continuous smooth output voltage.

The present invention provides a power factor correction circuit and a MOSFET circuit integrated into a single IC, therefore saving space and reducing costs while increase potential and frequency. Therefore, signals provided by the present invention ensure a smooth and high quality power to the system, thus improving the quality and performance of the overall system.

Another embodiment of the present invention a power factor correction circuit, a pulse width modulation control circuit, and MOSFET circuits integrated into a single IC.

Refer to FIG. 1, which is a block diagram illustrating an integrated circuit with integrated power factor correction circuit and MOSFET circuit according to an embodiment of the present invention.

The integrated circuit 100 comprises a power factor correction circuit 120 and a MOSFET circuit 150.

The power factor correction circuit 120 comprises an IAC input 121, a VRMS input 122, an ISENSE input 123, and a PFC-DRV output 125.

The IAC input 121 and VRMS input 122 supply input signals to the power factor correction circuit 120.

The ISENSE input 123 is utilized by the power factor correction circuit 120 to detect and limit the current to the power factor correction circuit 120. If the current is not within the desired range, the PFC-DRV output 125 will be held low or shut off, thus protecting the integrity of the power factor correction circuit 120 and the MOSFET circuit 150.

The MOSFET circuit 150 is connected to the PFC-DRV output 125 of the power factor correction circuit 120. The output of the MOSFET circuit 150 is provided as PFCOUT 170.

It should be noted that the embodiment shown in FIG. 1 comprises several inputs into the PFC circuit. However, in other embodiments of the present invention, these inputs are different. By determining which inputs are desired to be monitored or controlled by the PFC, the system can be accurately designed. Therefore, the present invention provides for a selection of a variety of inputs and outputs of the integrated circuit without deviating from the intent and purpose of the present invention.

Another embodiment of the present invention discloses a more detailed description of the invention as shown in FIG. 2.

Refer to FIG. 2, which is a circuit diagram illustrating an integrated circuit with integrated power factor correction circuit and MOSFET circuit according to an embodiment of the present invention.

The integrated circuit 200 comprises a power factor correction circuit 220 and a MOSFET circuit 250.

In an embodiment of the present invention, the integrated circuit 200 further comprises a reference voltage circuit 290 which provides a VREF output 291.

The power factor correction circuit 220 comprises an IAC input 221, a VRMS input 222, an ISENSE input 223, a RAMP1 input 224, a VFB input 226, VEAO output 227, a IEAO output 228, and a PFC-DRV output 225.

The IAC input 221 and VRMS input 222 supply input signals to the power factor correction circuit 220.

The ISENSE input 223 is utilized by the power factor correction circuit 220 to detect and limit the current to the power factor correction circuit 220. If the current is not within the desired range, the PFC-DRV output 225 will be held low or shut off, thus protecting the integrity of the power factor correction circuit 220 and the MOSFET circuit 250.

The power factor correction circuit 220 further comprises a low power detection circuit 230, a VCC over-voltage protection circuit 240, a PFC over-voltage protection circuit 245, and a PFC current limiting circuit 255. The outputs of these protection circuits are logically considered so that if any one of these circuits detects one of these undesirable conditions, the PFC-DRV output 225 of the power factor correction circuit 220 is held low or switched off.

The MOSFET circuit 250 is connected to the PFC-DRV output 225 of the power factor correction circuit 220. The output of the MOSFET circuit 250 is provided as PFCOUT 270.

In another embodiment of the present invention, the integrated circuit comprises a power factor correction circuit, a pulse width modulation control circuit, and MOSFET circuits.

Refer to FIG. 3, which is a block diagram illustrating an integrated circuit with integrated power factor correction circuit, pulse width modulation control circuit, and MOSFET circuits according to an embodiment of the present invention.

The integrated circuit 300 comprises a power factor correction circuit 320, a pulse width modulation control circuit 330, a MOSFET circuit 350, and a MOSFET circuit 360.

The power factor correction circuit 320 comprises an IAC input 321, a VRMS input 322, an ISENSE input 323, and a PFC-DRV output 325.

The IAC input 321 and VRMS input 322 supply input signals to the power factor correction circuit 320.

The ISENSE input 323 is utilized by the power factor correction circuit 320 to detect and limit the current to the power factor correction circuit 320. If the current is not within the desired range, the PFC-DRV output 325 will be held low or shut off, thus protecting the integrity of the power factor correction circuit 320 and the MOSFET circuit 350.

The MOSFET circuit 350 is connected to the PFC-DRV output 325 of the power factor correction circuit 320. The output of the MOSFET circuit 350 is provided as PFCOUT 370.

The pulse width modulation control circuit 330 comprises a VDC input 331, a VFB input 332, a VCC input 333, a DCILIMIT input 334, and a PWM-DRV output 365.

The VDC input 331, VFB input 332, and VCC input 333 supply input signals to the pulse width modulation control circuit 330.

The DCILIMIT input 334 is utilized by the pulse width modulation control circuit 330 to detect and limit the current to the pulse width modulation control circuit 330. If the current is not within the desired range, the PWM-DRV output 365 will be held low or shut off, thus protecting the integrity of the pulse width modulation control circuit 330 and the MOSFET circuit 360.

The MOSFET circuit 360 is connected to the PWM-DRV output 365 of the pulse width modulation control circuit 330. The output of the MOSFET circuit 360 is provided as PWMOUT 380.

Another embodiment of the present invention discloses a more detailed description of the invention as shown in FIG. 4.

Refer to FIG. 4, which is a circuit diagram illustrating an integrated circuit with integrated power factor correction circuit, pulse width modulation control circuit, and MOSFET circuits according to an embodiment of the present invention.

The integrated circuit 400 comprises a power factor correction circuit 420, a pulse width modulation control circuit 430, a MOSFET circuit 450, and a MOSFET circuit 460.

In an embodiment of the present invention, the integrated circuit 400 further comprises a reference voltage circuit 490 which provides a VREF output 491.

The power factor correction circuit 420 comprises an IAC input 421, a VRMS input 422, an ISENSE input 423, a RAMP1 input 424, a VFB input 426, VEAO output 427, a IEAO output 428, and a PFC-DRV output 425.

The IAC input 421 and VRMS input 422 supply input signals to the power factor correction circuit 420.

The ISENSE input 423 is utilized by the power factor correction circuit 420 to detect and limit the current to the power factor correction circuit 420. If the current is 110 not within the desired range, the PFC-DRV output 425 will be held low or shut off, thus protecting the integrity of the power factor correction circuit 420 and the MOSFET circuit 450.

The power factor correction circuit 420 further comprises a low power detection circuit 430, a VCC over-voltage protection circuit 440, a PFC over-voltage protection circuit 445, and a PFC current limiting circuit 455. The outputs of these protection circuits are logically considered so that if any one of these circuits detects one of these undesirable conditions, the PFC-DRV output 425 of the power factor correction circuit 420 is held low or switched off.

The MOSFET circuit 450 is connected to the PFC-DRV output 425 of the power factor correction circuit 420. The output of the MOSFET circuit 450 is provided as PFCOUT 470.

The pulse width modulation control circuit 430 comprises a RAMP2 input 432, a VDC input 431, an SS input 433, a DCILIMIT input 434, and a PWM-DRV output 465.

The VDC input 431, VFB input 432, and VCC input 433 supply input signals to the pulse width modulation control circuit 430.

The DCILIMIT input 434 is utilized by the pulse width modulation control circuit 430 to detect and limit the current to the pulse width modulation control circuit 430. If the current is not within the desired range, the PWM-DRV output 465 will be held low or shut off, thus protecting the integrity of the pulse width modulation control circuit 430 and the MOSFET circuit 460.

The pulse width modulation control circuit 430 further comprises a duty cycle limit circuit 435, a VIN OK circuit 485, a DC current limit circuit 486, and an under-voltage circuit 487. The outputs of these circuits are logically considered and if an undesirable condition is encountered, the PWM-DRV output 465 of the pulse width modulation control circuit 430 is held low or switched off.

The MOSFET circuit 460 is connected to the PWM-DRV output 465 of the pulse width modulation control circuit 430. The output of the MOSFET circuit 460 is provided as PWMOUT 480.

The present invention provides a power quality correction circuitry integrated into a single IC, therefore saving space and reducing costs while increase potential and frequency. Therefore, signals provided by the present invention ensure a smooth and high quality power to the system, thus improving the quality and performance of the overall system.

It should be noted that the various embodiments described above comprise various inputs into or outputs from the PFC circuit and the PWM circuit. However, in other embodiments of the present invention, these inputs and outputs are different. By determining which inputs are desired to be monitored or controlled by the PFC or PWM circuits, the system can be accurately designed. Therefore, the present invention provides for a selection of a variety of inputs and outputs of the integrated circuit without deviating from the intent and purpose of the present invention.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An integrated circuit comprising:
    a power factor correction circuit for providing a drive signal responsive to a voltage and a current supplied to the input terminals thereof;
    a logic circuit for inhibiting the drive signal when an inhibit signal is applied to one of a plurality of input terminals thereof;
    a system over-voltage protection circuit for providing a first inhibit signal to a first one of the plurality of input terminals of the logic circuit when a system voltage is above a predetermined level;
    a MOSFET circuit coupled to the logic circuit for providing an output signal responsive to the drive signal; and
    a reference voltage circuit for providing a reference voltage at an output terminal thereof, wherein the power factor correction circuit, the logic circuit, the system over-voltage protection circuit, the MOSFET circuit and the reference voltage circuit are constructed within a single integrated circuit package.

2. The integrated circuit of claim 1, wherein the power factor correction circuit includes a low power detect comparator for providing a second inhibit signal to a second one of the plurality of the input terminals of the logic circuit, the low power detect comparator detecting if power supplied to the power factor correction circuit is under a predetermined level.

3. The integrated circuit of claim 1, wherein the power factor correction circuit includes an over-voltage protection circuit for providing a third inhibit signal to a third one of the plurality of the input terminals of the logic circuit, the over-voltage protection circuit detecting if voltage supplied to the power factor correction circuit is over a predetermined level.

4. The integrated circuit of claim 1, wherein the power factor correction circuit includes a current limiting circuit for providing a fourth inhibit signal to a fourth one of the plurality of the input terminals of the logic circuit, the current limiting circuit detecting if current supplied to the power factor correction circuit is over a predetermined level.

5. An integrated circuit comprising:
    a power factor correction circuit for providing a first drive signal responsive to a voltage and a current supplied to the input terminals thereof;
    a first logic circuit for inhibiting the first drive signal when an inhibit signal is applied to one of a plurality of input terminals thereof;
    a system over-voltage protection circuit for providing a first inhibit signal to a first one of the plurality of input terminals of the first logic circuit when a system voltage is above a predetermined level;
    a first MOSFET circuit coupled to the first logic circuit for providing a power factor correction output signal responsive to the first drive signal;
    a pulse width modulation control circuit for providing a second drive signal responsive to a DC voltage at an input terminal thereof;
    a second logic circuit for inhibiting the second drive signal when an inhibit signal is applied to one of a plurality of input terminals thereof;
    a second MOSFET circuit coupled to the second logic circuit for providing a pulse width modulated output having a duty cycle responsive to the second drive signal; and
    a reference voltage circuit for providing a reference voltage at an output terminal thereof, wherein the power factor correction circuit, the first logic circuit, the system over-voltage protection circuit, the first MOSFET circuit, the pulse width modulation control circuit, the second MOSFET circuit and the reference voltage circuit are constructed within a single integrated circuit package.

6. The integrated circuit of claim 5, wherein the power factor correction circuit includes a low power detect comparator for providing a second inhibit signal to a second one of the plurality of the input terminals of the first logic circuit, the low power detect comparator detecting if power supplied to the power factor correction circuit is under a predetermined level.

7. The integrated circuit of claim 5, wherein the power factor correction circuit includes an over-voltage protection circuit for providing a third inhibit signal to a third one of the plurality of the input terminals of the first logic circuit, the over-voltage protection circuit detecting if voltage supplied to the power factor correction circuit is over a predetermined level.

8. The integrated circuit of claim 5, wherein the power factor correction circuit includes a current limiting circuit for providing a fourth inhibit signal to a fourth one of the plurality of the input terminals of the first logic circuit, the current limiting circuit detecting if current supplied to the power factor correction circuit is over a predetermined level.

9. The integrated circuit of claim 5, wherein the pulse width modulation control circuit includes a duty cycle limit circuit for providing a first inhibit signal to a first one of the plurality of the input terminals of the second logic circuit, the duty cycle limit circuit controlling the duty cycle of the pulse width modulation control circuit.

10. The integrated circuit of claim 5, wherein the pulse width modulation control circuit includes a power input confirmation circuit for providing p second inhibit signal to a second one of the plurality of the input terminals of the second logic circuit, the power input confirmation circuit determining if power input to the pulse width modulation control circuit is within predetermined limits.

11. The integrated circuit of claim 5, wherein the pulse width modulation control circuit includes a direct current limit circuit for providing a third inhibit signal to a third one of the plurality of the input terminals of the second logic circuit, the direct current limit circuit limiting the direct current applied to the pulse width modulation control circuit.

12. The integrated circuit of claim 5, wherein the pulse width modulation control circuit includes a system under-voltage detection circuit for providing a fourth inhibit signal to a fourth one of the plurality of the input terminals of the second logic circuit and a fifth inhibit signal to a fifth one of the plurality of input terminals of the first logic circuit, the system under-voltage detection circuit detecting if system power is under a predetermined level.

13. An integrated circuit comprising:
a power factor correction circuit for providing a first drive signal responsive to a voltage and a current supplied to the input terminals thereof, the power factor correction circuit including:
a first logic circuit for inhibiting the first drive signal when an inhibit signal is applied to one of a plurality of input terminals thereof;
a low power detect comparator for providing a first inhibit signal to a first one of the plurality of the input terminals of the first logic circuit, the low power detect comparator detecting if power supplied to the power factor correction circuit is under a predetermined level;
an over-voltage protection circuit for providing a second inhibit signal to a second one of the plurality of the input terminals of the first logic circuit, the over-voltage protection circuit detecting if power supplied to the power factor correction circuit is over a predetermined level;
a current limiting circuit for providing a third inhibit signal to a third one of the plurality of the input terminals of the first logic circuit, the current limiting circuit detecting if current supplied to the power factor correction circuit is over a predetermined level; and
a system over-voltage protection circuit for providing a fourth inhibit signal to a fourt one of the plurality of input terminals of the first logic circuit, the system over-voltage protection circuit detecting if system voltage is over a predetermined level;
a first MOSFET circuit coupled to the first logic circuit for providing a power factor correction output signal responsive to the first drive signal;
a pulse width modulation control circuit for providing a second drive signal responsive to a DC voltage at an input terminal thereof, the pulse width modulation control circuit including:
a second logic circuit for inhibiting the second drive signal when an inhibit signal is applied to one of a plurality of input terminals thereof;
a duty cycle limit circuit for providing a first inhibit signal to a first one of the plurality of the input terminals of the second logic circuit, the duty cycle limit circuit controlling the duty cycle of the pulse width modulation control circuit;
a power input confirmation circuit for providing a second inhibit signal to a second one of the plurality of the input terminals of the second logic circuit, the power input confirmation circuit determining if power input to the pulse width modulation control circuit is within predetermined limits;
a direct current limit circuit for providing a third inhibit signal to a third one of the plurality of the input terminals of the second logic circuit, the direct current limit circuit limiting the direct current applied to the pulse width modulation control circuit; and
a system under-voltage detection circuit for providing a fourth inhibit signal to a fourth one of the plurality of the input terminals of the second logic circuit and a fifth inhibit signal to a fifth one of the plurality of input terminals of the first logic circuit, the system under-voltage detection circuit detecting if system power is under a predetermined level; and
a second MOSFET circuit coupled to the second logic circuit for providing a pulse width modulated output having a duty cycle responsive to the second drive signal; and
a reference voltage circuit for providing a reference voltage at an output terminal thereof, wherein the power factor correction circuit, the first MOSFET circuit, the pulse width modulation control circuit, the second MOSFET circuit and the reference voltage circuit are constructed within a single integrated circuit package.

* * * * *